United States Patent
Mininni et al.

(10) Patent No.: US 9,518,632 B1
(45) Date of Patent: *Dec. 13, 2016

(54) TIMING GEAR SYSTEM

(71) Applicants: Dominick Joseph Mininni, Anthem, AZ (US); Mary Elizabeth Mininni, Anthem, AZ (US)

(72) Inventors: Dominick Joseph Mininni, Anthem, AZ (US); Mary Elizabeth Mininni, Anthem, AZ (US)

(73) Assignees: Dominick Joseph Mininni, Anthem, AZ (US); Mary Elizabeth Mininni, Anthem, AZ (US)

(*) Notice: Subject to any disclaimer, the term of this patent is extended or adjusted under 35 U.S.C. 154(b) by 188 days.

This patent is subject to a terminal disclaimer.

(21) Appl. No.: 14/490,472

(22) Filed: Sep. 18, 2014

Related U.S. Application Data

(63) Continuation-in-part of application No. 13/573,316, filed on Sep. 10, 2012, now Pat. No. 8,851,037.

(Continued)

(51) Int. Cl.

| | |
|---|---|
| *F01M 9/10* | (2006.01) |
| *F16H 1/20* | (2006.01) |
| *F16H 57/021* | (2012.01) |
| *F16H 25/08* | (2006.01) |
| *F01L 3/08* | (2006.01) |
| *F01L 1/12* | (2006.01) |
| *F01M 9/12* | (2006.01) |
| *F01L 3/10* | (2006.01) |
| *F02F 7/00* | (2006.01) |

(52) U.S. Cl.
CPC ............... *F16H 1/20* (2013.01); *F16H 25/08* (2013.01); *F16H 57/021* (2013.01); *F01L 1/12* (2013.01); *F01L 3/08* (2013.01); *F01L 3/10* (2013.01); *F01M 9/12* (2013.01); *F02F 7/006* (2013.01)

(58) Field of Classification Search
CPC .................. F01L 3/08; F01L 3/10; F01L 1/12; F02F 7/006; F01M 9/10
USPC ...................................................... 123/90.37
See application file for complete search history.

(56) References Cited

U.S. PATENT DOCUMENTS 3,415,137 A * 12/1968 Casale ...................... F01L 1/02
123/90.15
4,261,310 A 4/1981 Laws
(Continued)

OTHER PUBLICATIONS

Steve, At What RPM Does a Raised Cam Position Become Beneficial, Jun. 24, 2010 2:02 PM, www.corvetteforum.com. pp. 1 and 2.*

*Primary Examiner* — Lindsay Low
*Assistant Examiner* — Charles Brauch

(57) ABSTRACT

An automobile timing gear system for use with a non-standard cylinder block that employs a raised camshaft location features a timing gear cover assembly having a first cover component, a second cover component, and an annular back plate component. The system features an idler gear support plate attached to a second cover component inside surface. The system features an idler gear on an idler shaft. A camshaft gear is attached to a camshaft anterior end and a crankshaft gear is attached to a crankshaft anterior end. The back plate component is attached to a cylinder block front surface. The second cover component having the idler gear, the idler shaft, and the idler gear support plate located thereon is attached to the back plate component. The first cover component is attached to the back plate component next to the second cover component.

10 Claims, 13 Drawing Sheets

Related U.S. Application Data

(60) Provisional application No. 61/627,724, filed on Oct. 18, 2011, provisional application No. 61/962,690, filed on Nov. 14, 2013.

(56) References Cited

U.S. PATENT DOCUMENTS

| | | |
|---|---|---|
| 4,867,335 A | 9/1989 | Segal |
| 4,970,999 A * | 11/1990 | Jingu ................... F01L 1/02 123/195 C |
| 5,645,024 A | 7/1997 | Allen et al. |
| 5,851,313 A | 12/1998 | Milam |
| 6,325,033 B1 | 12/2001 | Iwata |
| 6,752,119 B2 * | 6/2004 | Coleman ................ F01L 1/02 123/195 C |
| 7,171,939 B1 | 2/2007 | Tiller |
| 7,194,994 B1 | 3/2007 | Chisenhall et al. |
| 2005/0016490 A1 | 1/2005 | Stone |
| 2006/0185427 A1 | 8/2006 | Ono et al. |
| 2007/0056544 A1 * | 3/2007 | Purcilly ................. F01L 1/02 123/90.31 |
| 2013/0092120 A1 | 4/2013 | Mininni |

* cited by examiner

TIMING GEAR SYSTEM

CROSS REFERENCE

This application claims priority to U.S. Provisional Patent Application No. 61/627,724, filed on Oct. 18, 2011, U.S. Non-Provisional patent application Ser. No. 13/573,316, filed on Sep. 10, 2012 as continuation-in-part, and claims priority to U.S. Provisional Patent Application No. 61/962,690, filed Nov. 14, 2013, the specification(s) of which is/are incorporated herein in their entirety by reference.

FIELD OF THE INVENTION

The present invention relates to timing gear assemblies and timing gear covers used on an automotive engine.

BACKGROUND OF THE INVENTION

Engine components that have been specially designed and manufactured to improve performance in automobile engines have been widely used, almost since the mass production of automobiles began. Different types of timing chain drives, timing belt drives, and timing gear drives have been developed to improve performance and reliability. The present invention features an automobile timing gear system for use with a non-standard cylinder block that employs a raised camshaft location.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an automobile timing gear system for use with a non-standard cylinder block that employs a raised camshaft location. In some embodiments, the system comprises a camshaft axis is located offset from and parallel to a crankshaft axis.

In some embodiments, the system comprises a timing gear cover assembly located on the cylinder block. In some embodiments, the timing gear cover comprises a first cover component, a second cover component, and an annular back plate component.

In some embodiments, the system comprises an idler gear support plate attached to a second cover component inside surface. In some embodiments, the system comprises an idler shaft perpendicularly attached to the idler gear support plate of the second cover component and the second cover component inside surface. In some embodiments, the system comprises an idler gear.

In some embodiments, a camshaft gear is attached to a camshaft anterior end. In some embodiments, a crankshaft gear is attached to a crankshaft anterior end. In some embodiments, the back plate component is attached to a cylinder block front surface surrounding the camshaft gear and the crankshaft gear via mounting apertures and mounting hardware.

In some embodiments, the idler gear is attached to the idler shaft. In some embodiments, the second cover component having the idler gear, the idler shaft, and the idler gear support plate located thereon is attached to the back plate component. In some embodiments, the idler gear is inserted into both the camshaft gear and the crankshaft gear.

In some embodiments, the first cover component is attached to the back plate component next to the second cover component to enclose the camshaft gear and the crankshaft gear. In some embodiments, the first cover component is designed to provide rapid removal once installed on the cylinder block. In some embodiments, the automobile timing gear system is for use with a non-standard cylinder block that employs a raised camshaft location.

DESCRIPTION OF PREFERRED EMBODIMENTS

Figure 1:
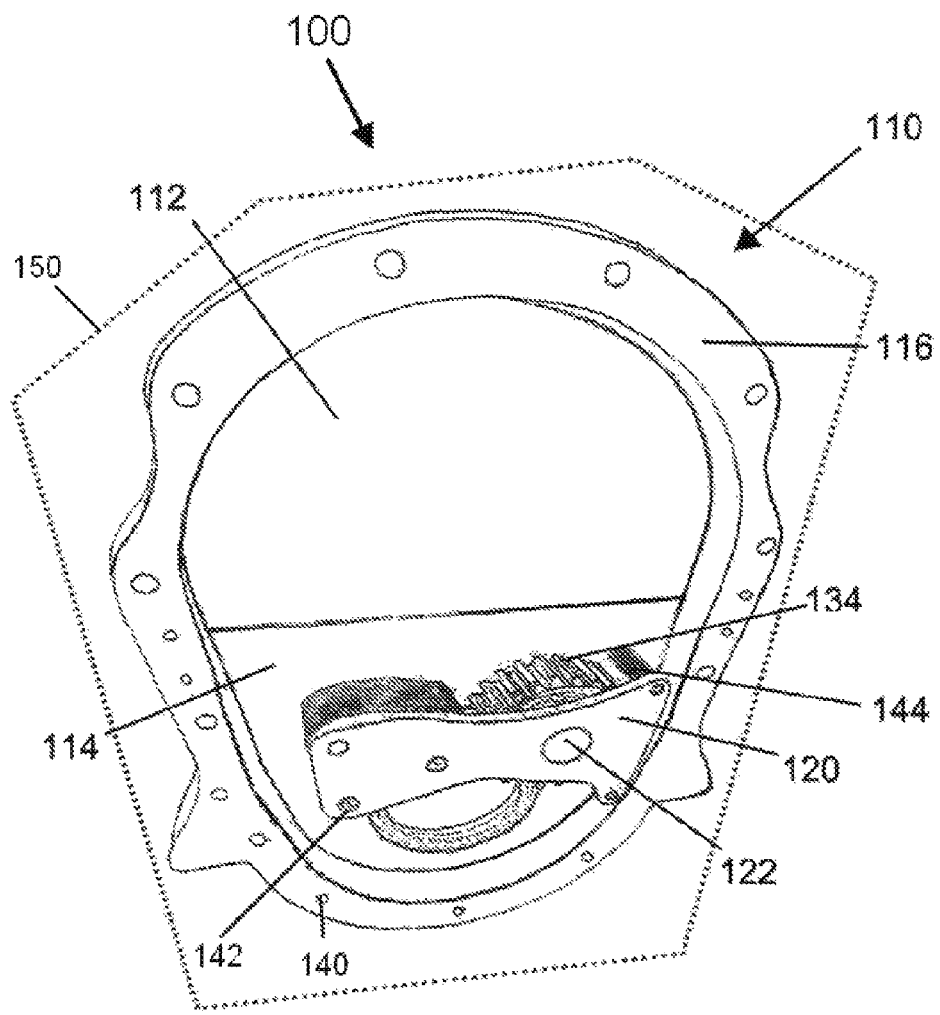
FIG. 1 shows a rear, perspective view of the timing gear cover assembly of the present invention.
Figure 2:
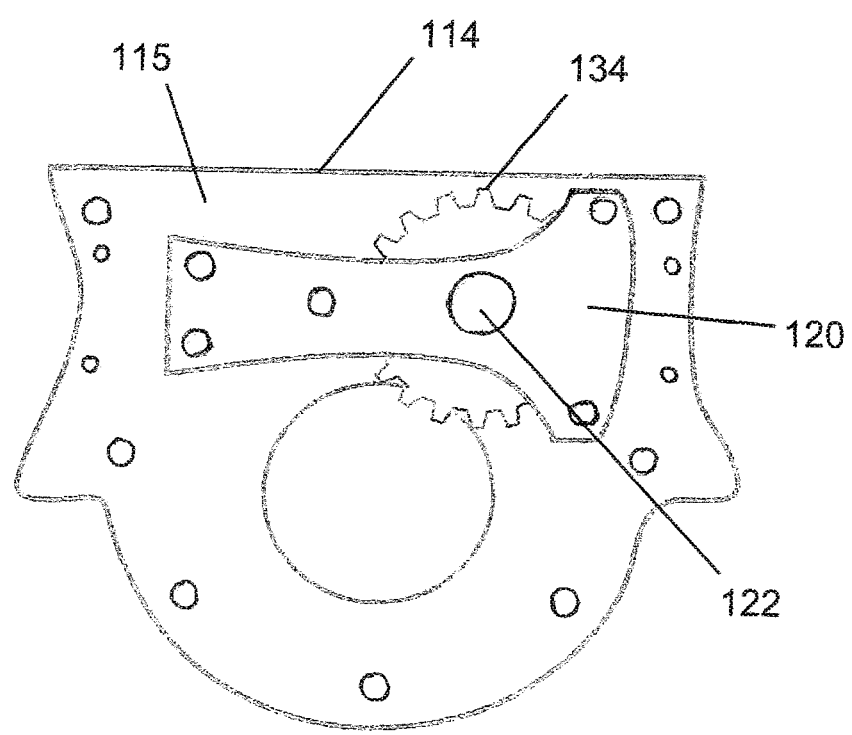
FIG. 2 shows a rear view of the idler gear support plate, the idler gear, and the second cover component of the present invention.
Figure 3:
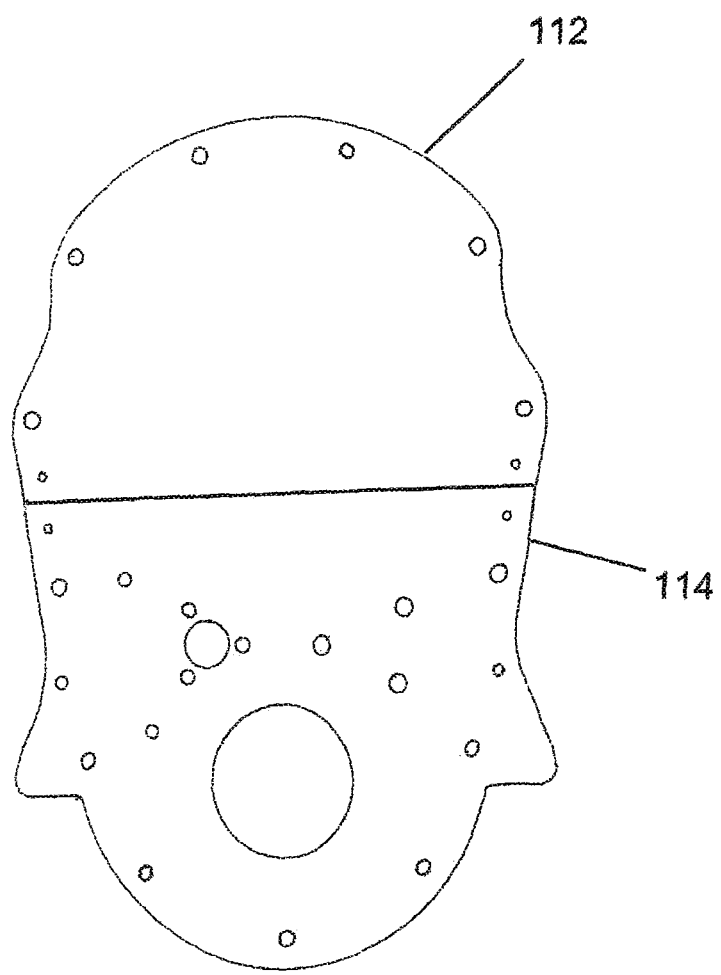
FIG. 3 shows a front view of the first cover component and the second cover component of the present invention.
Figure 4:
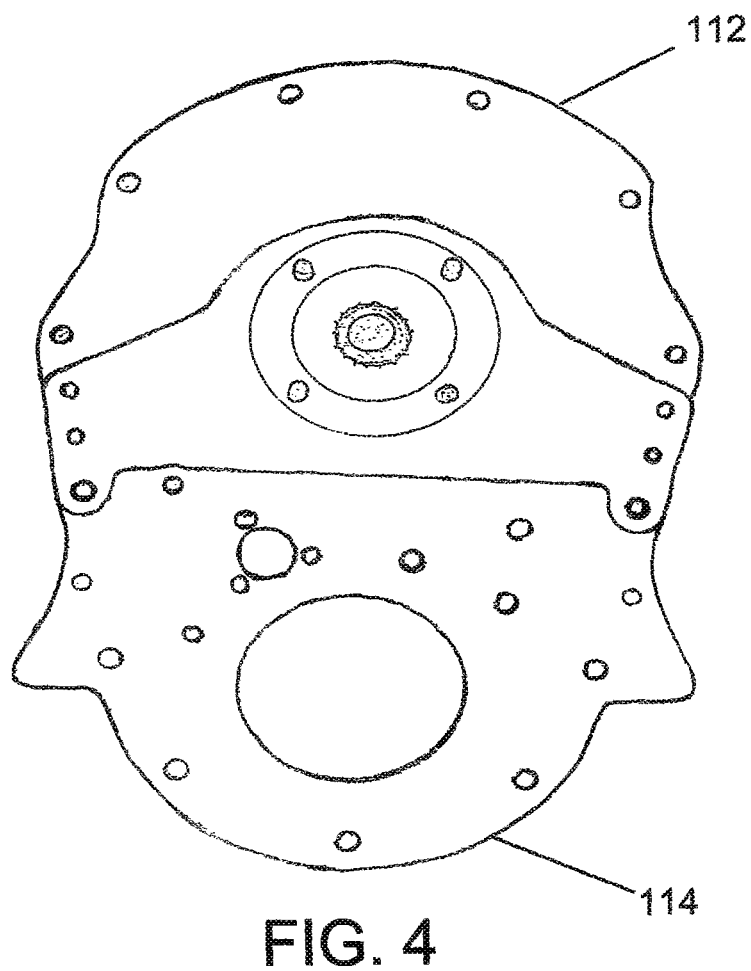
FIG. 4 shows a front view of the timing gear cover assembly of the present invention with a cam drive adapter plate attached.
Figure 5:
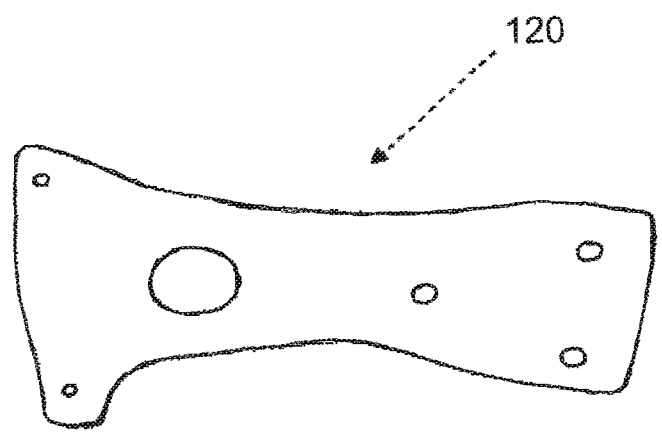
FIG. 5 shows a front view of the idler gear support plate of the present invention.
Figure 6:
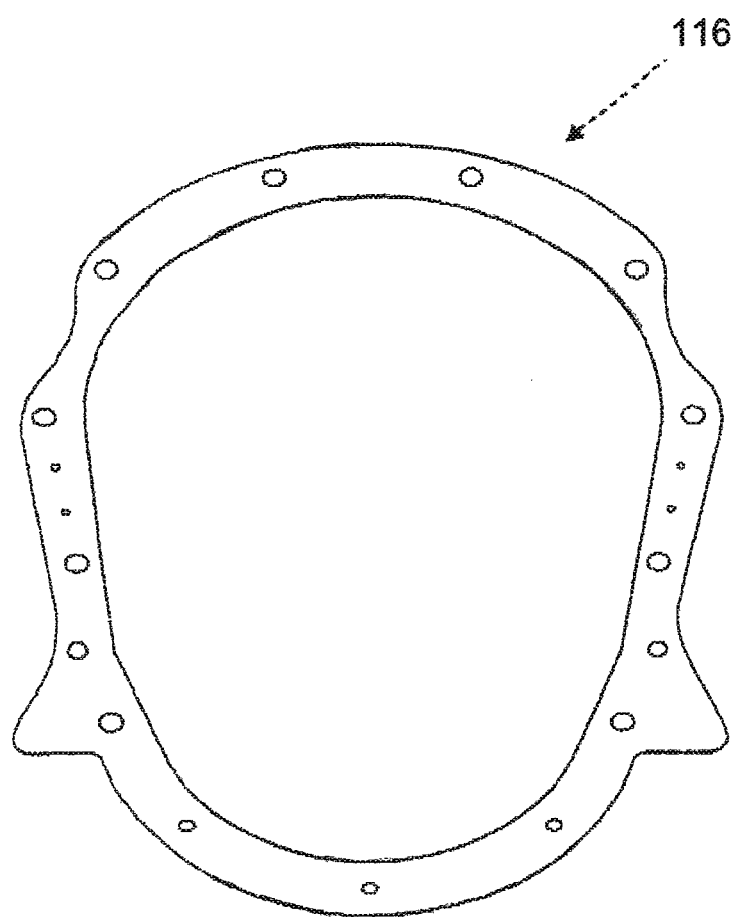
FIG. 6 shows a front view of the back plate component of the present invention.
Figure 7:
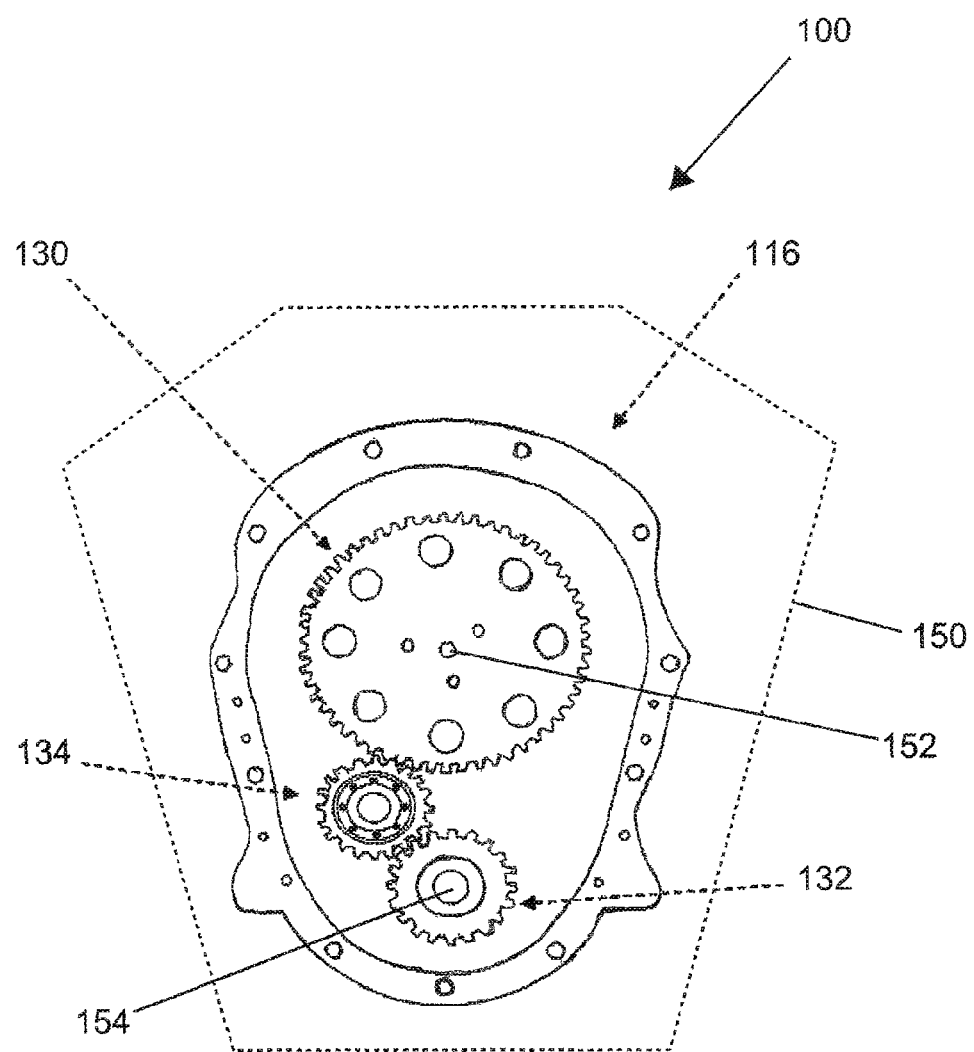
FIG. 7 shows a front view of the present invention.
Figure 8:
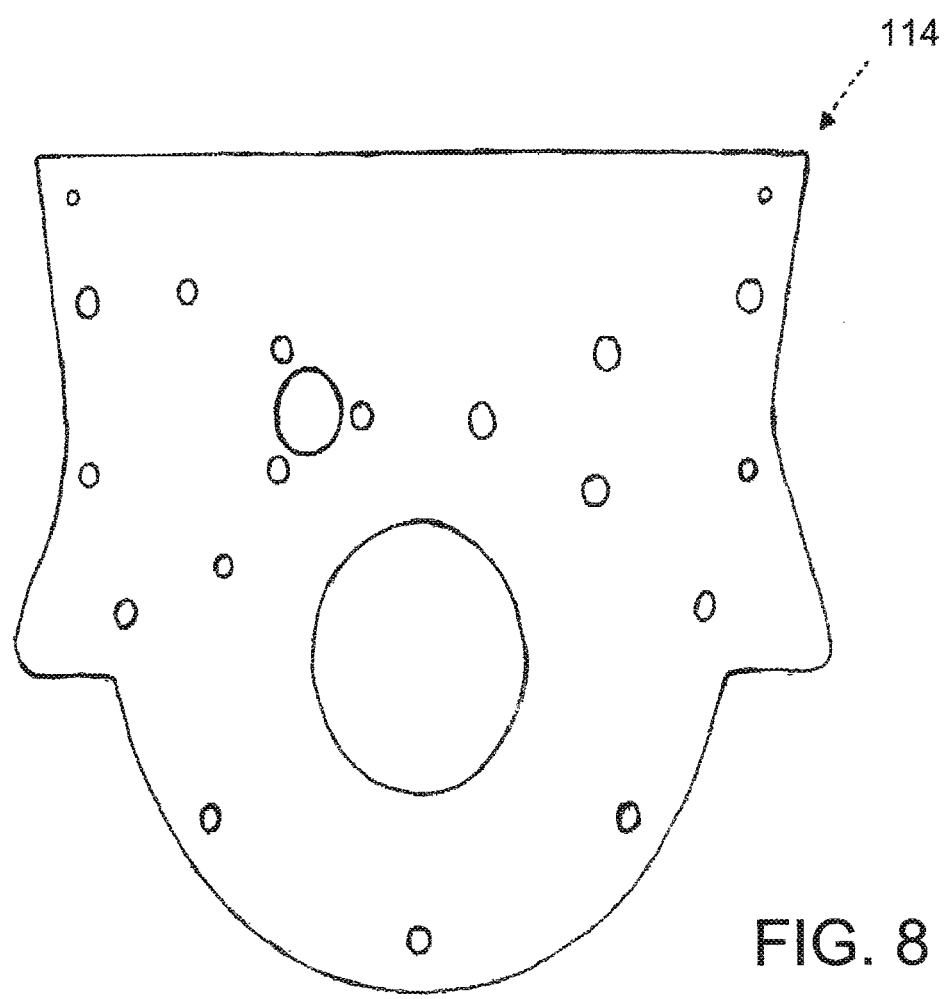
FIG. 8 shows a front view of the second cover component of the present invention.
Figure 9:
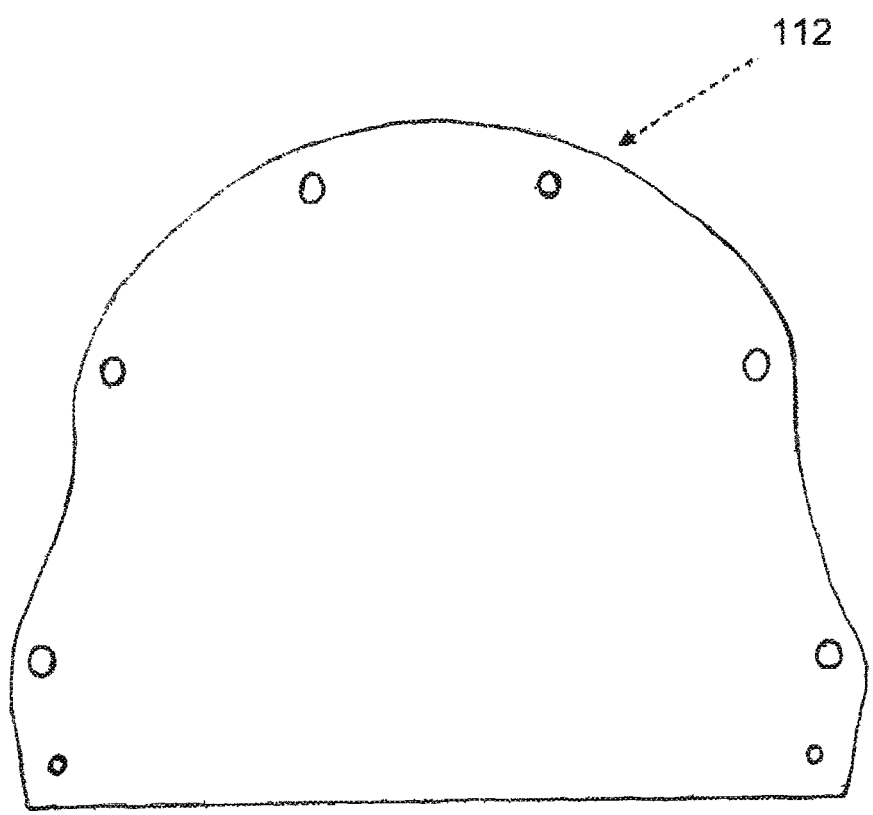
FIG. 9 shows a front view of the first cover component of the present invention.
Figure 10:
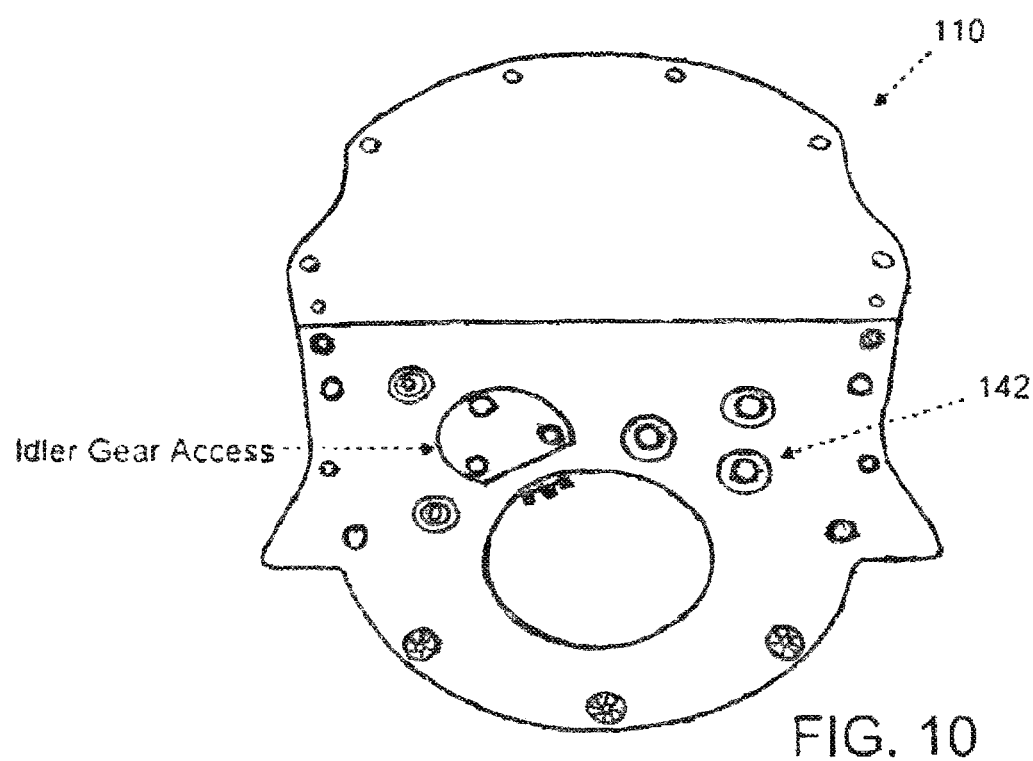
FIG. 10 shows a front view of the present invention.
Figure 11:
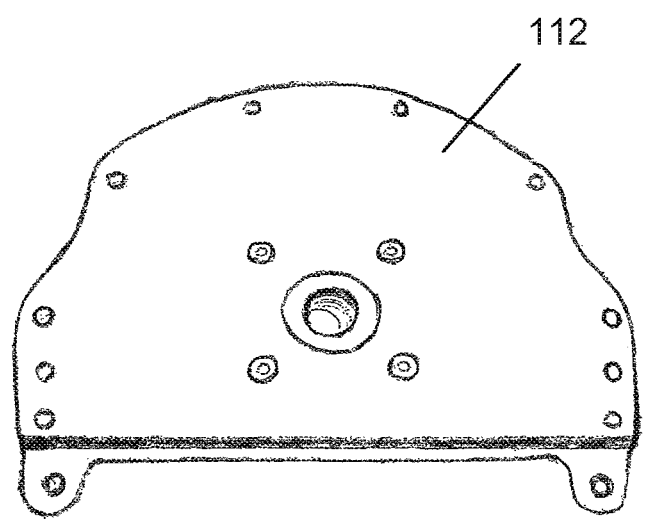
FIG. 11 shows a rear view of an alternate embodiment of the first cover component of the present invention with the cam drive adapter plate. A cam drive shaft access hole, a thrust bearing recessed hole, and 4 attaching holes are shown.
Figure 12:
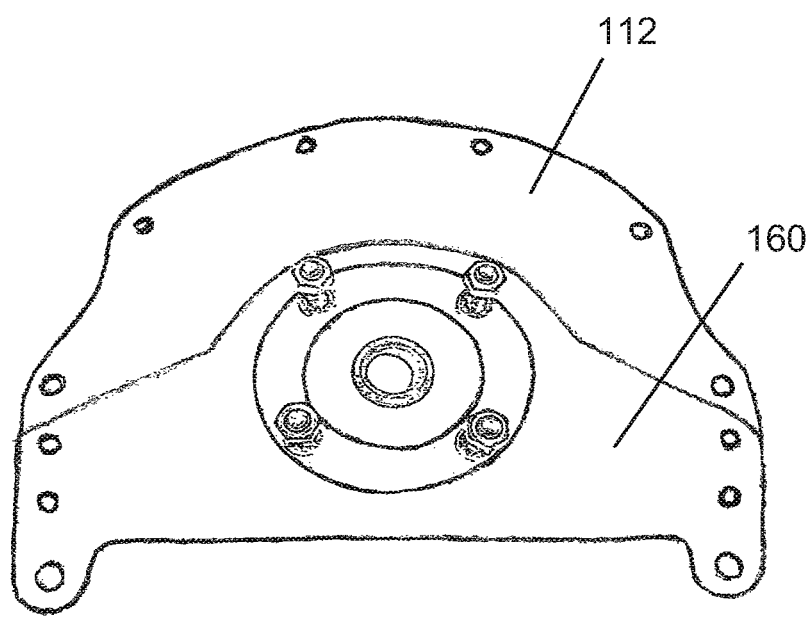
FIG. 12 shows a front view of an alternate embodiment of the first cover component and the cam drive adapter plate of the present invention. The cam drive adapter plate is mounted with hardware spacer and shaft seal.
Figure 13:
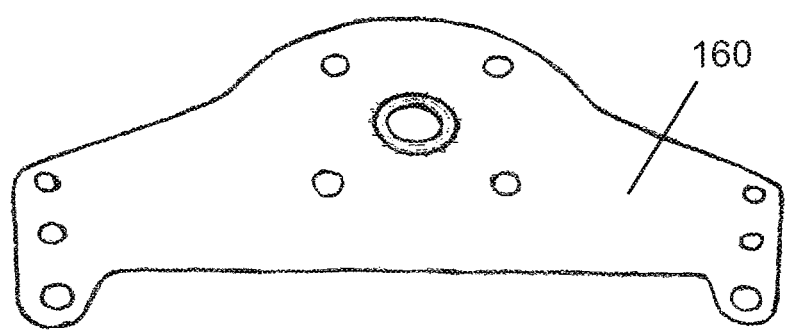
FIG. 13 shows a front view of the cam drive adapter plate of the present invention. The shaft seal and mounting holes are shown.

Following is a list of elements corresponding to a particular element referred to herein:
  100 Timing gear system
  110 Timing gear cover assembly
  112 First cover component
  114 Second cover component
  115 Second cover component inside surface
  116 Back plate component
  120 Idler gear support plate
  122 Idler shaft
  130 Camshaft gear
  132 Crankshaft gear
  134 Idler gear
  140 Aperture
  142 Hardware
  144 Spacer
  150 Cylinder block
  152 Camshaft axis 154 Crankshaft axis
160 Cam drive adapter plate Referring now to FIG. 1-10, the present invention features an automobile timing gear system (100) for use with a non-standard cylinder block that employs a raised camshaft location. In some embodiments, the system (100) comprises a non-standard cylinder block (150) having a raised camshaft location from a stock position. In some embodiments, a camshaft axis (152) is located offset from and parallel to a crankshaft axis (154).

In some embodiments, the system (100) comprises a timing gear cover assembly (110) located on the cylinder block (150). In some embodiments, the timing gear cover assembly (110) comprises a first cover component (112), a second cover component (114), and an annular back plate component (116).

In some embodiments, the system (100) comprises an idler gear support plate (120) located on and offset from a second cover component inside surface (115) via mounting hardware (142) and mounting spacers (144).

In some embodiments, the system (100) comprises an idler shaft (122) perpendicularly located between the idler gear support plate (120) and the second cover component inside surface (115).

In some embodiments, the system (100) comprises an idler gear (134).

In some embodiments, a camshaft gear (130) is located on a camshaft anterior end. In some embodiments, a crankshaft gear (132) is located on a crankshaft anterior end. In some embodiments, the back plate component (116) is located on a cylinder block front surface surrounding the camshaft gear (130) and the crankshaft gear (132) via mounting apertures (140) and mounting hardware (142), In some embodiments, the idler gear (134) rotates on the idler shaft (122). In some embodiments, the second cover component (114) having the idler gear (134), the idler shaft (122), and the idler gear support plate (120) located thereon is located on the back plate component (116). In some embodiments, the idler gear (134) interfaces with both the camshaft gear (130) and the crankshaft gear (132).

In some embodiments, the first cover component (112) is located on the back plate component (116) next to the second cover component (114) to enclose the camshaft gear (130) and the crankshaft gear (132). In some embodiments, the first cover component (112) is designed to provide rapid removal once installed on the cylinder block (150). In some embodiments, the automobile timing gear system (100) is for use with a non-standard cylinder block (150) that employs a raised camshaft location.

In some embodiments, the camshaft axis (152) is offset from the crankshaft axis (154) by 0.600 inch from a stock location. In some embodiments, the camshaft axis (152) is offset from the crankshaft axis (154) by 5.752 inches.

In some embodiments, the camshaft axis (152) is offset from the crankshaft axis (154) by 0.400 inch from a stock location. In some embodiments, the camshaft axis (152) is offset from the crankshaft axis (154) by 0.500 inch from a stock location. In some embodiments, the camshaft axis (152) is offset from the crankshaft axis (154) by 0.300 inch from a stock location. In some embodiments, the camshaft axis (152) is offset from the crankshaft axis (154) by 0.200 inch from a stock location. In some embodiments, the camshaft axis (152) is offset from the crankshaft axis (154) by 0.100 inch from a stock location.

In some embodiments, the timing cover is constructed from aluminum. In some embodiments, the timing cover is constructed from steel or another rigid material.

In some embodiments, the idler gear support plate (120) is constructed from steel. In some embodiments, the idler gear support plate (120) is constructed from aluminum or another rigid material.

In some embodiments, the first cover component (112) and the second cover component (114) interface only at a linear seam. In some embodiments, the first cover component (112) attaches to the back plate component (116) and the second cover component (114) attaches to the back plate component (116). In some embodiments, the first cover component (112) only attaches to the back plate component (116) and the second cover component (114) only attaches to the back plate component (116).

In some embodiments, the camshaft gear (130), the crankshaft gear (132), and the idler gear (134) lie on the same plane.

In some embodiments, the idler gear support plate (120) is planar.

In some embodiments, the first cover component (112) is planar. In some embodiments, the first cover component (112) is 0.250 inch thick.

In some embodiments, the second cover component (114) is planar. In some embodiments, the second cover component (114) is 0.250 inch thick.

In some embodiments, the back plate component (116) is 0.750 inch thick.

In some embodiments, the system (100) comprises a cam drive adapter plate (160). In some embodiments, the first cover component (112) comprises an aperture disposed therein when used with the cam drive adapter plate (160). In some embodiments, the camshaft is rotatably attached through the first cover component (112) through a seal to the cam drive adapter plate (160) for external fuel pump mounting. In some embodiments, the cam drive adapter plate (160) can be used to attach the external fuel pump. In some embodiments, the external fuel pump can be driven by the camshaft.

In some embodiments, the 0.600" raised Timing Gear Drive Cover System comprises a removable upper half for easy cam timing adjustments. In some embodiments, applications include high performance racing engine blocks such as manufactured by Dart, Brodix, and others. In some embodiments, the engine blocks are custom Chevrolet big block designs with the camshaft position raised 0.600 thousandths of an inch higher than stock location. In some embodiments, one unique part of the invention is the three-piece cover made of T6-6061 billet aluminum. In some embodiments, a timing gear idler shaft is relocated to a different position in the front bottom half of the cover. Relocating the idler shaft and gear allows it to be applied to a 0.600 raised cam engine block. In some embodiments, a 4340 steel idler gear support plate has been added to the back side of the cover. The purpose of this plate is to support the end of the idler shaft which increases the strength to be used in high horsepower engine applications. In some embodiments, a direct drive system such as this means no chain or belt is used. By using the gear drive system, comprising a cam gear, an idler gear and a crank shaft gear, the engine builder is able to configure a very high horsepower engine application.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An automobile timing gear system (100) for use with a non-standard cylinder block that employs a raised camshaft location, wherein the system (100) comprises:
   (a) the non-standard cylinder block (150) having the raised camshaft location from a stock position, wherein a camshaft axis (152) is disposed offset from and parallel to a crankshaft axis (154);
   (b) a timing gear cover assembly (110) disposed on the cylinder block (150), wherein the timing gear cover assembly (110) comprises a first cover component (112), a second cover component (114), and an annular back plate component (116), wherein the first cover component (112) is removably attached to the annular back plate component (116), and the second cover component (114) is removably attached to the annular back plate component (116) such that the first cover component (112) and the second cover component (114) are coplanar and form a linear seam at which they interface;
   (c) an idler gear support plate (120) disposed on and offset from a second cover component inside surface (115) via mounting hardware (142) and mounting spacers (144),
   (d) an idler shaft (122) perpendicularly disposed between the idler gear support plate (120) and the second cover component inside surface (115); and
   (e) an idler gear (134);
wherein a camshaft gear (130) is disposed on a camshaft anterior end, wherein a crankshaft gear (132) is disposed on a crankshaft anterior end, wherein the back plate component (116) is disposed on a cylinder block front surface surrounding the camshaft gear (130) and the crankshaft gear (132) via mounting apertures (140) and mounting hardware (142), wherein the idler gear (134) is rotatably disposed on the idler shaft (122), wherein the second cover component (114) having the idler gear (134), the idler shaft (122), and the idler gear support plate (120) disposed thereon is disposed on the back plate component (116), wherein the idler gear (134) is interfacingly disposed into both the camshaft gear (130) and the crankshaft gear (132), wherein the first cover component (112) is disposed on the back plate component (116) adjacent to the second cover component (114) to enclose the camshaft gear (130) and the crankshaft gear (132), wherein the first cover component (112) is designed to provide rapid removal once installed on the cylinder block (150), wherein the automobile timing gear system (100) is for use with the non-standard cylinder block (150) that employs the raised camshaft location.

2. The system (100) of claim 1, wherein the camshaft axis (152) is offset from the crankshaft axis (154) by 0.600 inch from a stock location.

3. The system (100) of claim 1, wherein the camshaft axis (152) is offset from the crankshaft axis (154) by 0.400 inch from a stock location.

4. The system (100) of claim 1, wherein the camshaft axis (152) is offset from the crankshaft axis (154) by 0.100 inch from a stock location.

5. The system (100) of claim 1, wherein the camshaft gear (130), the crankshaft gear (132), and the idler gear (134) lie on the same plane.

6. The system (100) of claim 1, wherein the idler gear support plate (120) is planar.

7. The system (100) of claim 1, wherein the first cover component (112) is planar.

8. The system (100) of claim 1, wherein the second cover component (114) is planar.

9. The system (100) of claim 1 further comprising a cam drive adapter plate (160) disposed on an outer surface of the first cover component (112).

10. An automobile timing gear system (100) for use with a non-standard cylinder block that employs a raised camshaft location, wherein the system (100) consists of:
   (a) a non-standard cylinder block (150), wherein a camshaft axis (152) is disposed offset from and parallel to a crankshaft axis (154);
   (b) a timing gear cover assembly (110) disposed on the cylinder block (150), wherein the timing gear cover assembly (110) consisting of a first cover component (112), a second cover component (114), and an annular back plate component (116), wherein the first cover component (112) is removably attached to the annular back plate component (116), and the second cover component (114) is removably attached to the annular back plate component (116) such that the first cover component (112) and the second cover component (114) are coplanar and form a linear seam at which they interface;
   (c) an idler gear support plate (120) disposed on and offset from a second cover component inside surface (115) via mounting hardware (142) and mounting spacers (144),
   (d) an idler shaft (122) perpendicularly disposed between the idler gear support plate (120) and the second cover component inside surface (115); and
   (e) an idler gear (134);
wherein a camshaft gear (130) is disposed on a camshaft anterior end, wherein a crankshaft gear (132) is disposed on a crankshaft anterior end, wherein the back plate component (116) is disposed on a cylinder block front surface surrounding the camshaft gear (130) and the crankshaft gear (132) via mounting apertures (140) and mounting hardware (142), wherein the idler gear (134) is rotatably disposed on the idler shaft (122), wherein the second cover component (114) with the idler gear (134), the idler shaft (122), and the idler gear support plate (120) disposed thereon is disposed on the back plate component (116), wherein the idler gear (134) is interfacingly disposed into both the camshaft gear (130) and the crankshaft gear (132), wherein the first cover component (112) is disposed on the back plate component (116) adjacent to the second cover component (114) to enclose the camshaft gear (130) and the crankshaft gear (132), wherein the first cover component (112) is designed to provide rapid removal once installed on the cylinder block (150), wherein the automobile timing gear system (100) is for use with the non-standard cylinder block (150) that employs the raised camshaft location.

\* \* \* \* \*